US007870246B1

(12) United States Patent
Davis et al.

(10) Patent No.: US 7,870,246 B1
(45) Date of Patent: Jan. 11, 2011

(54) SYSTEM, METHOD, AND COMPUTER PROGRAM PRODUCT FOR PLATFORM-INDEPENDENT PORT DISCOVERY

(75) Inventors: Michael Anthony Davis, Orland Park, IL (US); Damon J. Gallaty, Zephyrhills, FL (US); Steighton L. Haley, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 948 days.

(21) Appl. No.: 11/215,386

(22) Filed: Aug. 30, 2005

(51) Int. Cl.
*G06F 15/173* (2006.01)
(52) U.S. Cl. .................. 709/224; 709/220; 709/225; 709/226; 726/1; 726/3
(58) Field of Classification Search .............. 709/223, 709/227, 224, 220; 726/1, 3
See application file for complete search history.

(56) References Cited

U.S. PATENT DOCUMENTS

| | | | | |
|---|---|---|---|---|
| 5,909,549 A | 6/1999 | Compliment et al. | ....... | 709/223 |
| 6,122,639 A | 9/2000 | Babu et al. | .............. | 707/103 R |
| 6,170,015 B1 * | 1/2001 | Lavian | ....................... | 709/232 |
| 6,292,838 B1 | 9/2001 | Nelson | ....................... | 709/236 |
| 6,360,260 B1 | 3/2002 | Compliment et al. | ....... | 709/224 |
| 6,377,987 B1 * | 4/2002 | Kracht | ....................... | 709/220 |
| 6,411,997 B1 * | 6/2002 | Dawes et al. | ................ | 709/224 |
| 6,516,345 B1 | 2/2003 | Kracht | ....................... | 709/220 |
| 6,636,499 B1 | 10/2003 | Dowling | ....................... | 370/338 |
| 6,654,796 B1 * | 11/2003 | Slater et al. | ................. | 709/220 |
| 6,795,403 B1 | 9/2004 | Gundavelli | ................. | 370/256 |
| 6,895,433 B1 * | 5/2005 | Slater et al. | ................. | 709/220 |
| 6,907,609 B1 | 6/2005 | Kukura et al. | ............... | 719/316 |
| 6,922,722 B1 * | 7/2005 | Mann et al. | ................. | 709/220 |
| 7,206,833 B1 * | 4/2007 | Sarangam et al. | ........... | 709/224 |
| 7,269,625 B1 | 9/2007 | Willhide et al. | ............. | 709/206 |
| 7,284,267 B1 | 10/2007 | McArdle et al. | .............. | 726/11 |
| 7,318,089 B1 * | 1/2008 | Stachura et al. | ............. | 709/223 |
| 7,328,260 B1 | 2/2008 | Muthiyan et al. | ........... | 709/224 |
| 7,483,395 B2 * | 1/2009 | Iwanaga et al. | ............. | 370/254 |
| 2001/0012297 A1 | 8/2001 | Hrastar et al. | ............... | 370/401 |
| 2002/0032760 A1 * | 3/2002 | Matthews et al. | ........... | 709/223 |
| 2003/0037163 A1 | 2/2003 | Kitada et al. | ................. | 709/236 |
| 2003/0055968 A1 * | 3/2003 | Hochmuth et al. | .......... | 709/226 |
| 2003/0061393 A1 | 3/2003 | Steegmans et al. | .......... | 709/250 |
| 2003/0072059 A1 | 4/2003 | Thomas et al. | .............. | 359/167 |
| 2003/0191989 A1 | 10/2003 | O'Sullivan | .................... | 714/47 |
| 2003/0208622 A1 | 11/2003 | Mosier | ....................... | 709/244 |
| 2003/0229686 A1 | 12/2003 | Kortright | ..................... | 709/220 |
| 2004/0010569 A1 | 1/2004 | Thomas et al. | .............. | 709/220 |
| 2004/0093408 A1 | 5/2004 | Hirani et al. | ................. | 709/224 |
| 2004/0103282 A1 | 5/2004 | Meier et al. | .................. | 713/171 |
| 2004/0190446 A1 * | 9/2004 | Ansorge et al. | ............. | 370/228 |
| 2004/0215781 A1 | 10/2004 | Pulsipher et al. | ............ | 709/227 |

(Continued)

OTHER PUBLICATIONS

Office Action Summary from U.S. Appl. No. 11/215,646 mailed on Aug. 14, 2008.

(Continued)

*Primary Examiner*—Michael Won
(74) *Attorney, Agent, or Firm*—Zilka-Kotab, PC

(57) ABSTRACT

A system, method, and computer program product are provided. Initially, platform-independent information relating to a network device is collected. Thereafter, a port on which the network device resides is determined based on the platform-independent information.

15 Claims, 7 Drawing Sheets

U.S. PATENT DOCUMENTS

| | | | |
|---|---|---|---|
| 2004/0264484 A1 | 12/2004 | Kui et al. | 370/402 |
| 2005/0172142 A1* | 8/2005 | Shelest et al. | 713/191 |
| 2005/0193127 A1 | 9/2005 | Moore et al. | 709/228 |
| 2005/0198186 A1 | 9/2005 | Griv | 709/212 |
| 2006/0014565 A1 | 1/2006 | Chen | 455/557 |
| 2006/0021043 A1* | 1/2006 | Kaneko et al. | 726/24 |
| 2006/0031488 A1* | 2/2006 | Swales | 709/224 |
| 2006/0092861 A1 | 5/2006 | Corday et al. | 370/256 |
| 2006/0095954 A1 | 5/2006 | Buckley et al. | 726/2 |
| 2008/0301143 A1 | 12/2008 | Kim | 707/10 |

OTHER PUBLICATIONS

Final Office Action Summary from U.S. Appl. No. 11/215,646 mailed on Feb. 13, 2009.

Office Action Summary from U.S. Appl. No. 11/215,645 mailed on Mar. 27, 2009.

Final Office Acfion Summary from U.S. Appl. No. 11/215,646 mailed on Sep. 14, 2009.

Final Office Action from U.S. Appl. No. 11/215,645 dated Apr. 30, 2010.

http://www.netdisco.org, 2005.

Office Action Summary from U.S. Appl. No. 11/215,645 mailed on Oct. 19, 2009.

Non-Final Office Action Summary from U.S. Appl. No. 11/215,645 mailed on Oct. 4, 2010.

Advisory Action Summary from U.S. Appl. No. 11/215,645 mailed on Jul. 26, 2010.

* cited by examiner

SYSTEM, METHOD, AND COMPUTER PROGRAM PRODUCT FOR PLATFORM-INDEPENDENT PORT DISCOVERY

FIELD OF THE INVENTION

The present invention relates to networking, and more particularly to network device discovery.

BACKGROUND

Wide area computer networks are often maintained by a system administrator. One of the system administrator's functions is to set policy for and to maintain software on the computers comprising the network. Typically, the system administrator decides, among other things, which software products are to be installed on the client computers and how that software is to be configured.

In most wide area networks, the system administrator can communicate with each computer on the network in a secure manner because the computers are connected together with a private communication link. Messages, files, and data can be sent over the private communication link from one or more central servers to each computer on the network, and the computers on the network can use the private communication link to send messages, files, and data to one or more central servers.

Most wide area networks are also set up so that the system administrator can use a central server to configure software on the other computers in the network. The system administrator can issue and control policy for the wide area network and can update and configure software on any or all computers within the network. One typical and routine practice of a computer network system administrator is to periodically update virus scanning software, intrusion detection tools, etc. on the computers in the administrator's network. Various tools are available for facilitating such network management. One particular example of such a tool is the EPOLICY ORCHESTRATOR device manufactured by MCAFEE, INC.

However, before the administrator can manage a network in the foregoing manner, each of the pertinent network devices must first be discovered. In the past, this discovery process has been highly manual in nature. For example, some systems have relied heavily on manual entry or importation of data identifying such network devices. Unfortunately, such systems are more susceptible to error, inefficient, etc.

There is thus a need for overcoming these and/or other problems associated with the prior art.

SUMMARY

A system, method, and computer program product are provided. Initially, platform-independent information relating to a network device is collected. Thereafter, a port on which the network device resides is determined based on the platform-independent information.

DETAILED DESCRIPTION

Figure 1:
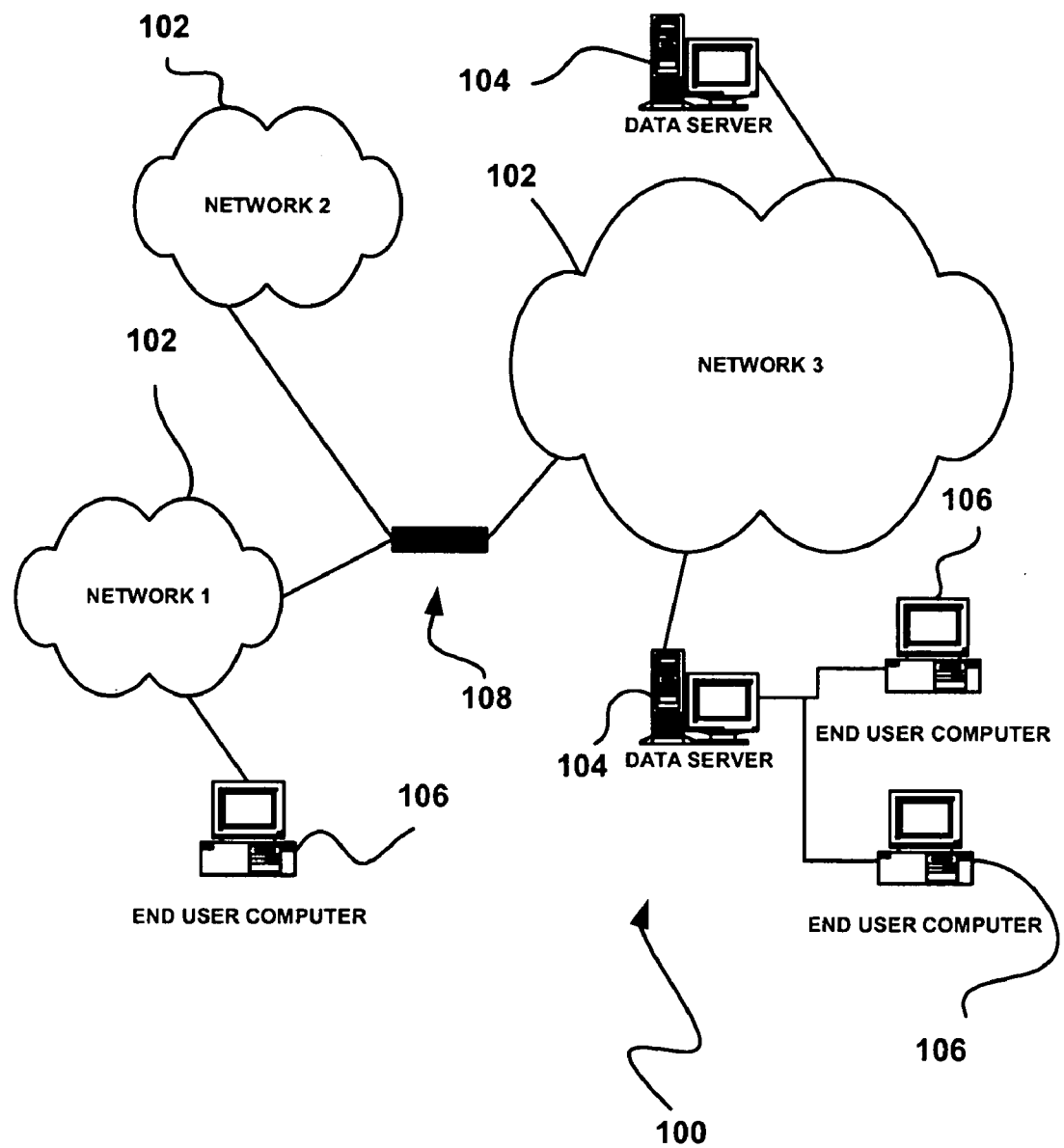
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc. Of course, any type of networks 102 may be involved.

Coupled to the networks 102 are data server computers 104 which are capable of communicating over the networks 102. Also coupled to the networks 102 and the data server computers 104 is a plurality of end user computers 106. Such client computers 106 may each include a desktop computer, lap-top computer, mobile phone, hand-held computer, any component of a computer, and/or any other type of logic.

In order to facilitate communication among the networks 102, a plurality of switches and routers 108 is coupled therebetween. Such switches may include, but are not limited to simple network management protocol (SNMP)-enabled switches, L2-capable switches, and/or any other type of switching device. Similarly, the routers may refer to any type of routing device.

In the context of the present description, the term "network device" may refer to any of the foregoing network components (e.g. computers, routers, switches, networks themselves, etc.) and/or any other component of a network or group of networks. It should be noted that any of the foregoing network devices may be equipped with various device discovery-related features. In one optional embodiment, such features may be provided by situating agents at each of the network devices.

By this design, different network device discovery techniques may be performed, in various embodiments. Specifically, in one embodiment, a discovery technique is provided for discovering various network devices including, for example, switches. Initially, a manufacturer associated with a network device is identified. Of course, such manufacturer may be any entity that, at least in part, contributes to the manufacture of the network device. Thereafter, information associated with the network device may be collected based on the identified manufacturer. In the context of the present description, such information may include any information capable of being used for network device (e.g. switch, etc.) discovery. A network device discovery operation may then be carried out utilizing the information, for the purpose of identifying previously unknown or obscure network devices. More information regarding one exemplary network device discovery technique will be set forth in greater detail during reference to FIG. 5 et al.

In another embodiment, an additional discovery technique is provided for discovering various network devices including, for example, routers. In use, information is received relating to a plurality of network devices on a network. Again, in the context of the present description, such information may include any information capable of being used for network device (e.g. router, etc.) discovery. Such information is then correlated, such that additional network devices on the network utilizing the information. In use, the discovery is enhanced as a result of the correlation. More information regarding one exemplary network device discovery technique will be set forth in greater detail during reference to FIG. 6.

Still yet, in yet another embodiment, platform-independent information relating to a network device is collected. In the context of the present description, such platform-independent information may include any information that allows the determination of a port on which the network device resides, irrespective of the fact that a corresponding network includes network devices manufactured by different parties. To this end, a port on which the network device resides may be determined based on the platform-independent information. More information regarding one exemplary platform-independent network device discovery technique will be set forth in greater detail during reference to FIG. 7 et al.

With the network devices discovered by way of the foregoing techniques, various subsequent processing may be facilitated. For example, an administrator may use such information for managing and configuring the discovered network devices. Of course, however, it should be noted that the network device discovery techniques disclosed herein may be employed for absolutely any desired purpose.

More illustrative information will now be set forth regarding various optional architectures and features with which the foregoing techniques may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
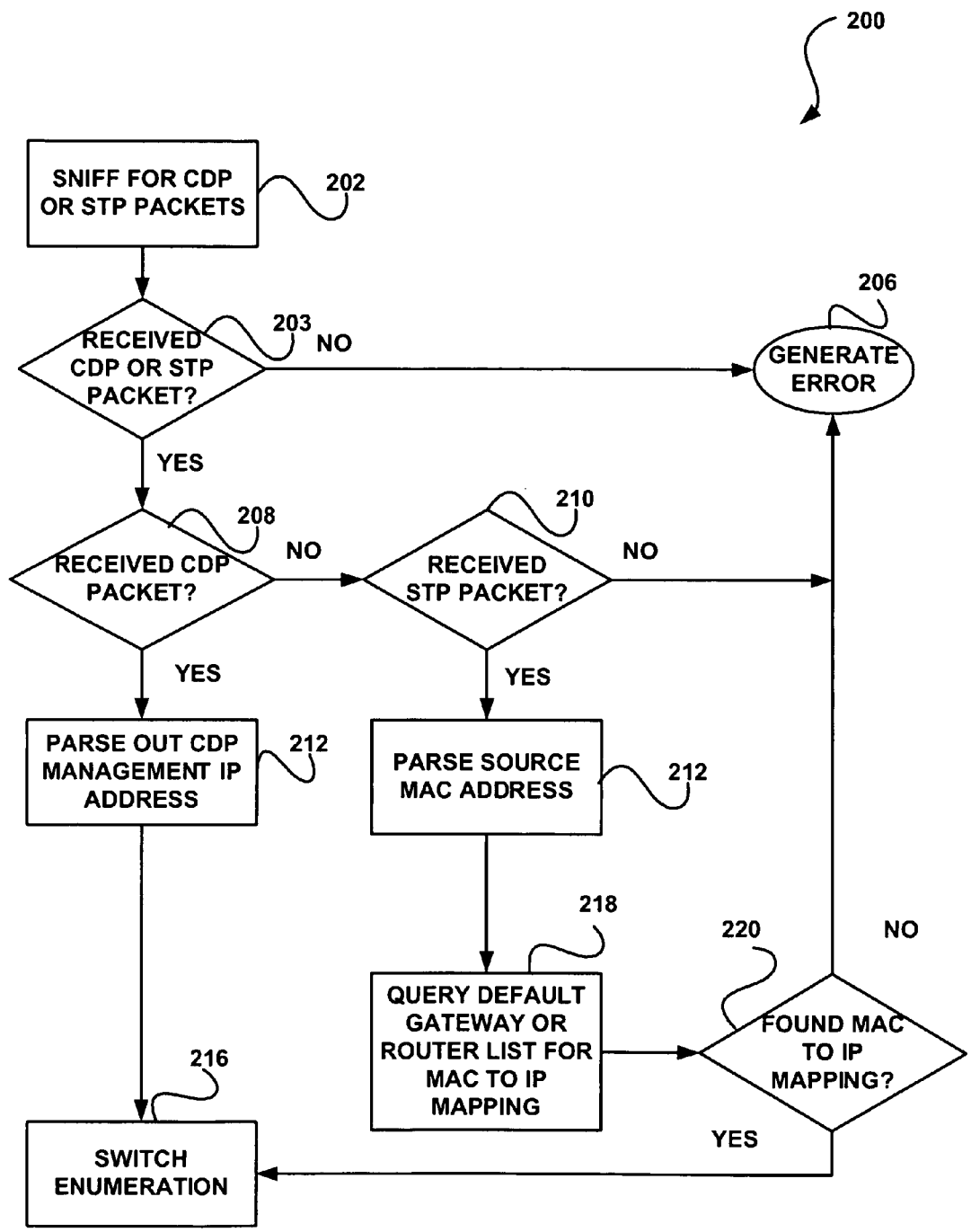
FIG. 2 shows a method for bootstrap switch discovery, in accordance with one embodiment.

FIG. 2 shows a method 200 for bootstrap switch discovery, in accordance with one embodiment. As an option, the present method 200 may be implemented in the context of the architecture and environment of FIG. 1. Of course, however, the method 200 may be carried out in any desired environment.

In operation 202, network communications (e.g. packets, etc.) are monitored for Cisco discovery protocol (CDP) or spanning tree protocol (STP) packets for a predetermined time. In one exemplary embodiment, the predetermined time may include 60 seconds. Of course, any time period may be utilized. While CDP and STP protocols are utilized herein, it should be noted that any desired protocols may be utilized that allows the present method 200 to, at least in part, initiate a later network device enumeration process.

Next, in decision 203, it is determined whether a CDP or STP packet is received. If it is determined that neither a CDP or STP packet is received, an error is generated in operation 206. If, on the other hand, it is determined that either a CDP or STP packet is received, such CDP or STP packet is used for identifying a first network device (e.g. switch, etc.) on which further network device discovery may be based.

Specifically, it is determined in decision 208 whether a CDP packet is received. If so, a CDP management IP address is parsed. Note operation 212. It should be noted that, in the case of a CDP packet, only the IP address is available. Thereafter, a network device enumeration operation may be performed in operation 216, since IP address is known. More information regarding such network device enumeration operation 216 will be set forth hereinafter in greater detail.

On the other hand, if it is determined in decision 208 that a CDP packet has not been received, it is then determined whether a STP packet is received. Note decision 210. If the STP is determined to be received, the Bridge ID (MAC address) is parsed, as indicated in operation 212. Still yet, since an IP address is not readily available using the STP packet, a default gateway or router list is queried in operation 218. Typically, such router list is readably available on a default machine in a management information base (MIB) address resolution protocol (ARP) cache, and conventionally includes a MAC-to-IP address mapping.

Thereafter, it is determined whether a MAC-to-IP address mapping is found. See decision 220. If not, the error is generated in operation 206 (similar to when it is determined that neither a CDP or STP packet is received per decisions 208-210). On the other hand, if such mapping is found per decision 220, the aforementioned network device enumeration operation may be performed in operation 216, since the IP address associated with the MAC address will be known.

More exemplary information regarding the foregoing network device enumeration will be set forth hereinafter in greater detail during reference to FIG. 3. Specifically, given the aforementioned MAC address and IP address of a first network device identified using the method 200 of FIG. 2, the network device enumeration of FIG. 2 et al. may be used to identify further network devices.

Figure 3:
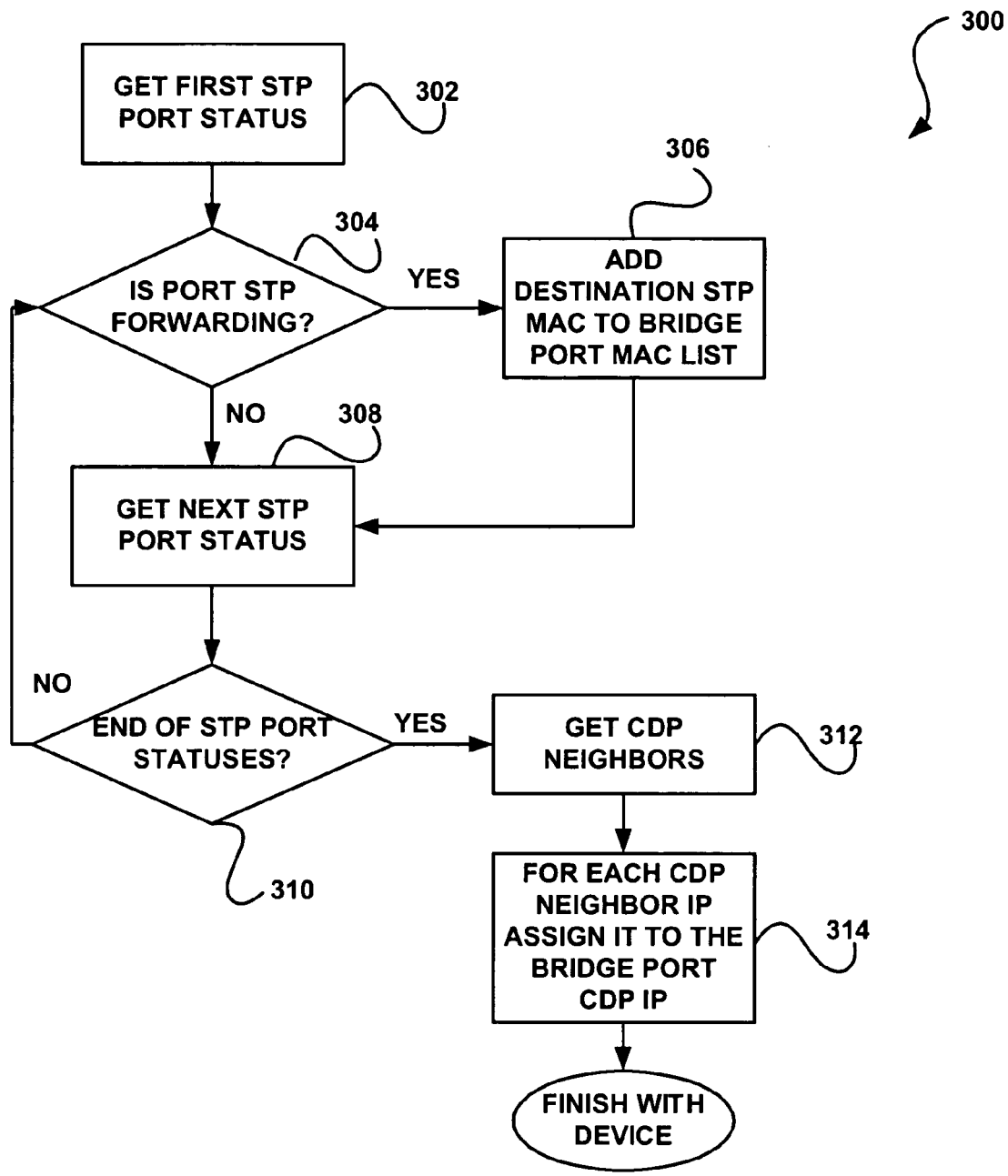
FIG. 3 shows a method for switch enumeration, in accordance with one embodiment.

FIG. 3 shows a method 300 for network device (e.g. switch) enumeration, in accordance with one embodiment. As an option, the present method 300 may be implemented in the context of the architecture and environment of FIGS. 1-2 and, in particular, operation 216 of FIG. 2. Of course, however, the method 300 may be carried out in any desired environment.

In use, a connection is made to the IP address identified during the method 200 of FIG. 2, utilizing SNMP. As shown, such connection allows a status of a first STP port (out of 24, for example) to be obtained in operation 302. Thereafter, it is determined from such status whether port STP forwarding is enabled. See decision 304. Such STP forwarding mode enables any STP packet to be forwarded to any network device connected to the port.

If this is enabled, it may be inferred that there is likely a network device connected to the port. Thus, the destination STP MAC address associated with any such forwarding mode is added to a bridge port MAC address list in operation 306. More information on the use of such list will be set forth hereinafter in greater detail.

Thereafter, or if it is determined that port STP forwarding is not enabled per decision 304 (and, thus, there is likely no network device coupled to the port), a next STP port status is obtained in operation 308. These operations then continue until an end of STP port statuses is reached (such that all 24 ports are reviewed), per decision 310.

Once such end is reached, CDP neighbors (i.e. other CDP-enabled devices, etc.) are obtained in operation 312. This may be accomplished by querying network device memory, which typically identifies the presence of CDP neighbors. Further, for each CDP neighbor, an associated IP address (which has a known corresponding MAC address) is stored in a bridge port CDP list, in operation 314. Again, details on the use of such information will be set forth hereinafter. To this end, the instant processing is finished with respect to the present network device.

More exemplary information regarding the manner in which the aforementioned device enumeration is carried out will be set forth hereinafter in greater detail during reference to FIG. 4. Specifically, the following information relates to underlying operations associated with the SNMP connection, that allows the information gathering of the method 300 of FIG. 3.

Figure 4:
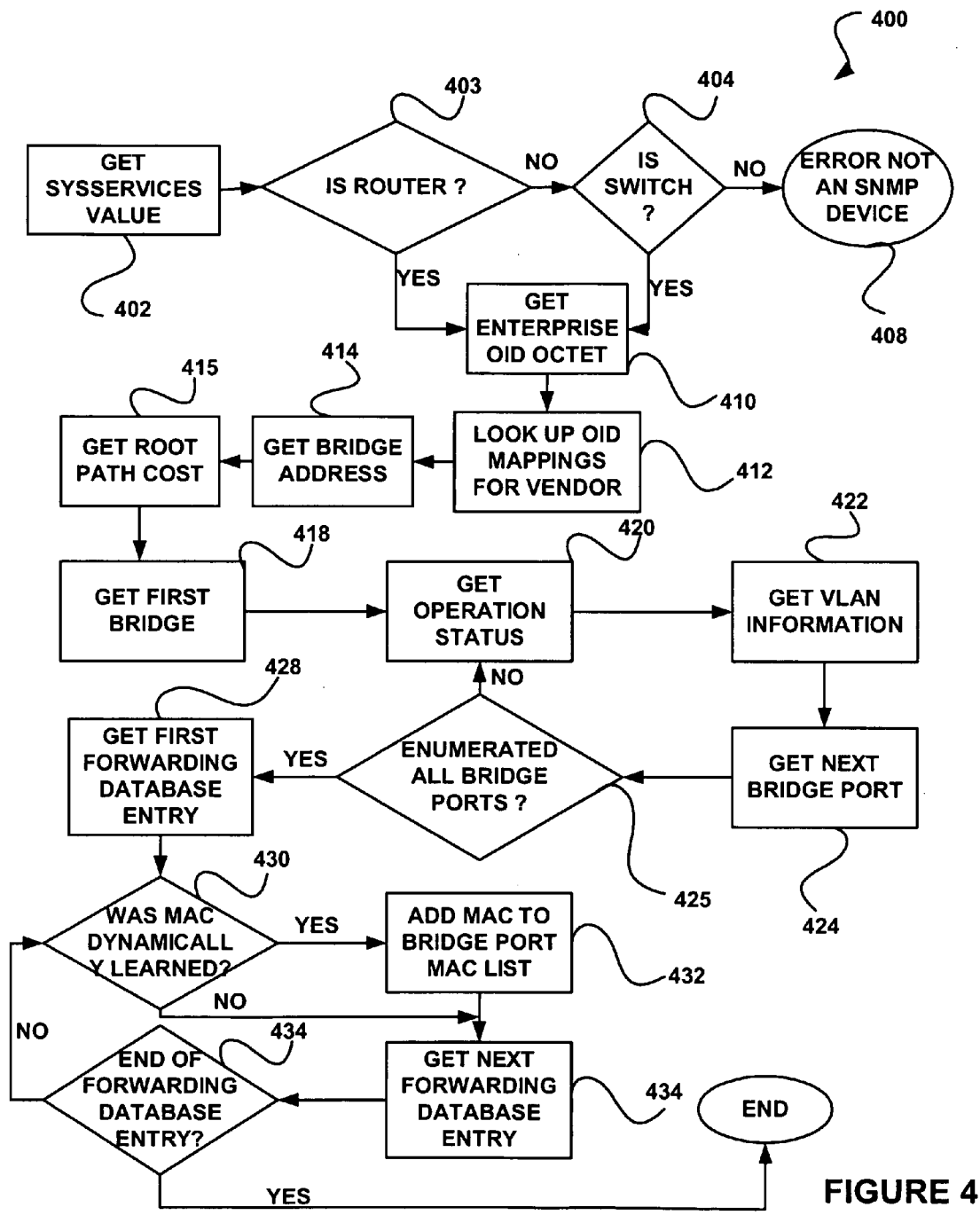
FIG. 4 shows a method for performing underlying switch enumeration operations, in accordance with one embodiment.

FIG. 4 shows a method 400 for performing underlying switch enumeration operations, in accordance with one embodiment. As an option, the present method 400 may be implemented in the context of the architecture and environment of FIGS. 1-3 and, in particular, as an underlying parallel operation with respect to the method 300 of FIG. 3. Of course, however, the method 400 may be carried out in any desired environment.

Initially, in operation 402, a services descriptor value is obtained via the aforementioned SNMP connection. In one embodiment, such services descriptor value may include a sysServices value and/or any other value that describes services rendered by a particular network device. With this information, in decision 404, it may be determined whether the current network device is a switch or a router in decisions 403 and 404, respectively. If the network device is neither, an error condition is provided to indicate that the device is not an SNMP network device.

However, if it is determined that the current network device is a switch or a router in decisions 403 and 404, a manufacturer object identifier [e.g. Enterprise object identifier (OID) octet, SysObject OID, etc.] is obtained. See operation 410. A manufacturer object identifier identifies a manufacturer (e.g. vendor, etc.) associated with the switch or router. To this end, a look up operation 412 may performed utilizing the manufacturer object identifier, in order to identify the related vendor as well as additional information. Table 1 illustrates an exemplary data structure that may be used in conjunction with the look up operation of operation 412.

TABLE 1

Enterprise OID octet: 9
VendorName: Cisco
VLAN: enterprises.9.9.68.1.2.2.1.2.0
ArpCache: MIB-2.4.22.1.2
OperStatus: MIB-2.2.2.1.8
STPRootCost: MIB-2.17.2.6
BridgeAddress: MIB-2.17.1.1.0
STPPortForwardState: 5

It should be noted that the foregoing data structure is set forth for illustrative purposes only and should not be construed as limiting in any way.

By way of background, the SNMP framework defines several generic MIBs to use when communicating with any SNMP-enabled network device. However, many vendors expand upon these MIBs or only provide certain information within an enterprise OID space. Because of these limitations, the aforementioned table may be useful to store the OID needed for each SNMP communication with a network device. In addition, such table allows the discovery process to work with any vendor-specific network device as long as the required OIDs are added to the vendor table. Whenever an OID is required, the proper OID may be searched for, within the vendor table, before communicating with the network device. If the OID is not available, a default or generic network device may be designated.

A bridge address (e.g. MAC address, etc.) is then obtained in operation 414, after which the STP root path cost (which indicates the spanning tree's path cost to the root bridge; similar to hop count) is obtained in operation 415. As an option, such information may be obtained via a data structure such as that of Table 1, for example.

To this end, a first bridge port may be obtained in operation 418, so that an operation status may be obtained. Note operation 420. Since physical ports may be combined, aggregated, etc., bridge ports are utilized in the context of the present embodiment. Next, virtual local area network (VLAN) information is obtained in operation 422. A next bridge port is then obtained in operation 424, and it is determined whether all of the bridge ports are enumerated in decision 425. If not, operations 420-424 are repeated until all of the bridge ports are indeed enumerated.

On the other hand, if it is determined that all of the bridge ports are enumerated in decision 425, a first forwarding database entry is obtained in operation 428. Such entry is the first of many stored in a conventional forwarding database associated with the network device. It is subsequently determined whether a MAC address associated with such entry was dynamically learned, as set forth in decision 430. In other words, it is determined whether the MAC address associated with such entry was learned via the methods of FIGS. 2-3.

If it was dynamically learned, the MAC address is added to the bridge port MAC address list which was previously described with respect to operation 306 of FIG. 3. Note operation 432. Specifically, each MAC address may be stored in association with a bridge port. Note Table 2, for example.

TABLE 2

| | |
|---|---|
| Bridge_port_1 | MAC_address_1 |
| | MAC_address_2 |
| | MAC_address_3 |
| Bridge_port_2 | MAC_address_4 |
| Bridge_port_3 | MAC_address_5 |
| | MAC_address_6 |
| | MAC_address_7 |

If, however, it is determined that the MAC address was not dynamically learned (or after the MAC address is added to the bridge port MAC address list in operation 432), the next forwarding database entry is obtained in operation 434. It is then determined whether the present method 400 is at the end of the forwarding database entries. If so, the method 400 is terminated. On the other hand, if it is determined that the present method 400 is not at the end of the forwarding database entries, operations 430-434 are repeated accordingly for the remaining entries.

More exemplary information will now be set forth regarding the manner in which network device discovery is carried out utilizing the information (e.g. bridge port MAC address list, bridge port CDP list, VLAN information, etc.) collected via the methods 200-400 of FIGS. 2-4. Specifically, in one embodiment, each additional network device in a catenet may be discovered utilizing the various collected information.

Figure 5:
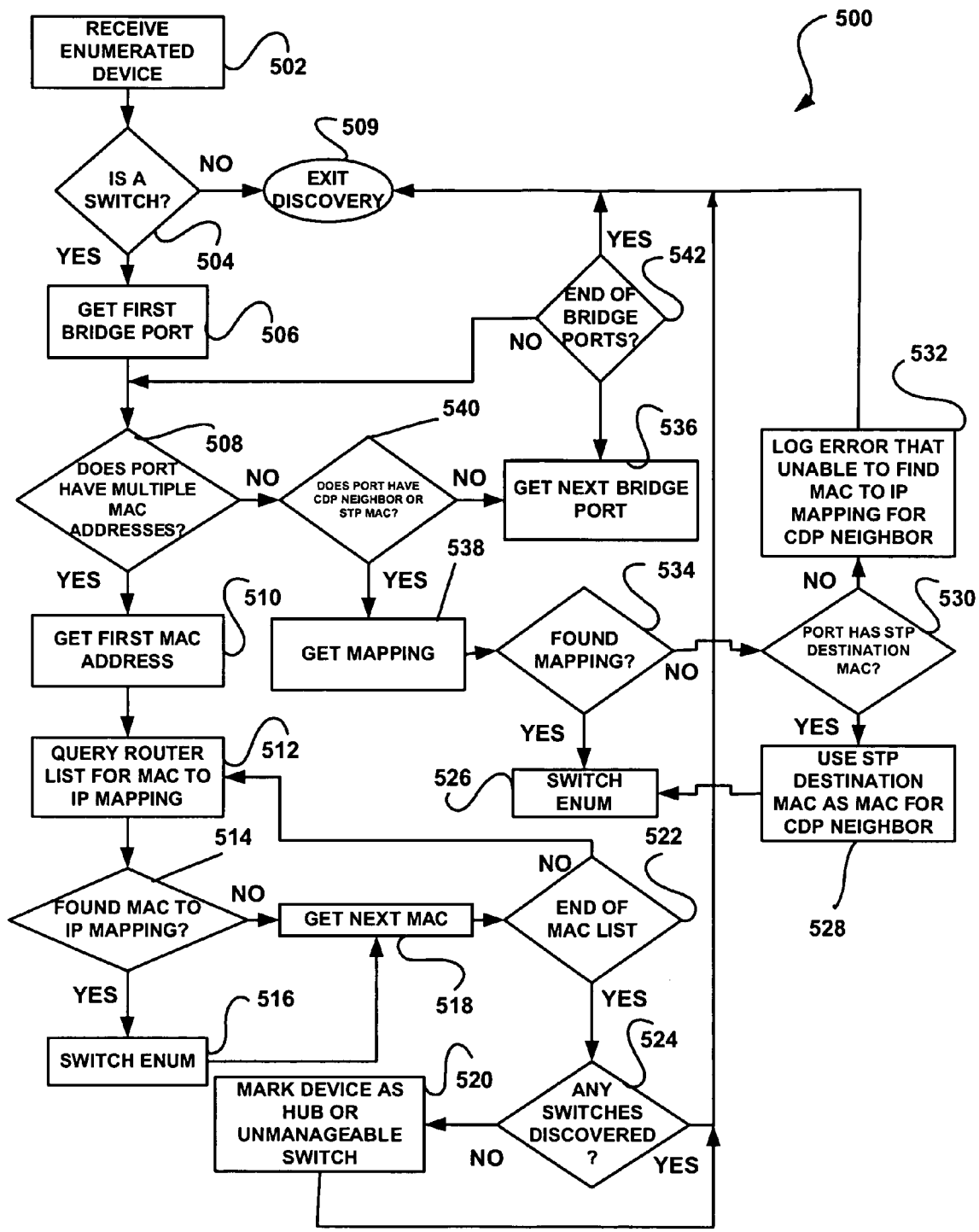
FIG. 5 shows a method for switch discovery, in accordance with one embodiment.

FIG. 5 shows a method 500 for network device (e.g. switch) discovery, in accordance with one embodiment. As an option, the present method 500 may be implemented in the context of the architecture and environment of FIGS. 1-4. Of course, however, the method 500 may be carried out in any desired environment.

As shown, information identifying an enumerated network device is received in operation 502, after which it is determined whether such network device is a switch in decision 504. If the network device is not a switch per decision 504, the method 500 is terminated in operation 509 as other network devices are not of interest at this stage.

If, on the other hand, the network device is indeed a switch, a first bridge port is obtained in operation 506. Thereafter, it is determined whether the port has multiple MAC addresses associated therewith (since such would indicate that a switch is coupled thereto). See decision 508. This may be accomplished utilizing the information gathered previously (e.g. the bridge port MAC address list, Table 2, etc.).

If multiple MAC addresses do indeed exist, a first MAC address is obtained in operation 510 after which a router list is queried for a MAC-to-IP address mapping in operation 512. It is then determined whether such mapping is found (see decision 514). If it is found, switch enumeration proceeds in operation 516 (note the methods 300 and 400 of FIGS. 3 and 4, respectively). To this end, switches are constantly enumerated when available. As is now further apparent, the various methods disclosed herein may be executed in parallel.

On the other hand, if it is determined that the mapping is not found (see decision 514), a next MAC address is obtained in operation 518, after which it is determined whether an end of the MAC address list has been reached in decision 522. If not, the router list is queried again for the MAC-to-IP address mapping in operation 512, and the method 500 proceeds thereafter with operations 514, 516, 518, etc.

If, however, it is determined that the end of the MAC address list has indeed been reached in decision 522, it is then determined whether any switches have been discovered. Note operation 524. If so, the discovery process is terminated per operation 509. Otherwise, the device is marked as a hub or an unmanageable switch in operation 520.

Referring back to decision 508, if it is determined that the port does not have multiple MAC addresses associated therewith, the method 500 continues by determining whether the port has a CDP neighbor (or STP MAC address) in decision 540 (which would, again, indicate the presence of a switch coupled to the port). Again, this may be accomplished utilizing the information (e.g. bridge port CDP list, etc.) gathered previously during the methods of the previous figures.

If not, a next bridge port is obtained in operation 536, and the method 500 continues with respect to decision 542. Specifically, it is determined whether an end of bridge ports has been reached. If so, the method 500 is terminated in operation 509. If not, though, the method 500 continues with decision 508.

If, however, it determined that the port has a CDP neighbor (or STP MAC address) in decision 540, a mapping is obtained. See operation 538. By way of background, CDP only provides an IP address, thus an IP-to-MAC address mapping is required to obtain the appropriate MAC address. On the other hand, STP only provides a MAC address, thus a MAC-to-IP address mapping is required to obtain the appropriate IP address.

If the appropriate mapping is found, switch enumeration proceeds in operation 526 (note the methods 300 and 400 of FIGS. 3 and 4, respectively). On the other hand, if it is determined that the appropriate mapping is not found in the case of a CDP neighbor (see decision 534), it is then determined whether the port has an STP destination MAC address. See decision 530.

If so, the STP destination MAC address is used as the MAC address for the CDP neighbor, as set forth in operation 528, and switch enumeration proceeds in operation 526 (note the methods 300 and 400 of FIGS. 3 and 4, respectively). Again referencing decision 530, if it is determined, on the other hand, that the port does not have an STP destination MAC address, an error is logged indicating that the method 500 was unable to find the MAC-to-IP address mapping for the CDP neighbor. See operation 532. Thereafter, the discovery process is terminated per operation 509.

Thus, once a network device (e.g. switch, etc.) has had all related bridge ports enumerated and stored, each stored port may be looped through so as to attempt to communicate with any IP address or MAC address found on the port. If a MAC address(es) is found on a port, the default gateway and any discovered routers may be used to find the IP address corresponding to the MAC address.

To this end, a platform-independent technique is provided for network device discovery. This is accomplished by collecting information on a network device based on an identified manufacturer associated with the network device. For example, if the network device is a Cisco® device, all CDP neighbors stored on the network device may be enumerated using a Cisco® CDP-MIB and by associating the IP address with the bridge port on which the CDP neighbor packet was received.

As mentioned previously, the method 500 is focused on the discovery of switches. Running in parallel (or serially, if desired) with such switch discovery process is a router discovery process. More information on such router discovery process will now be set forth during reference to FIG. 6.

Figure 6:
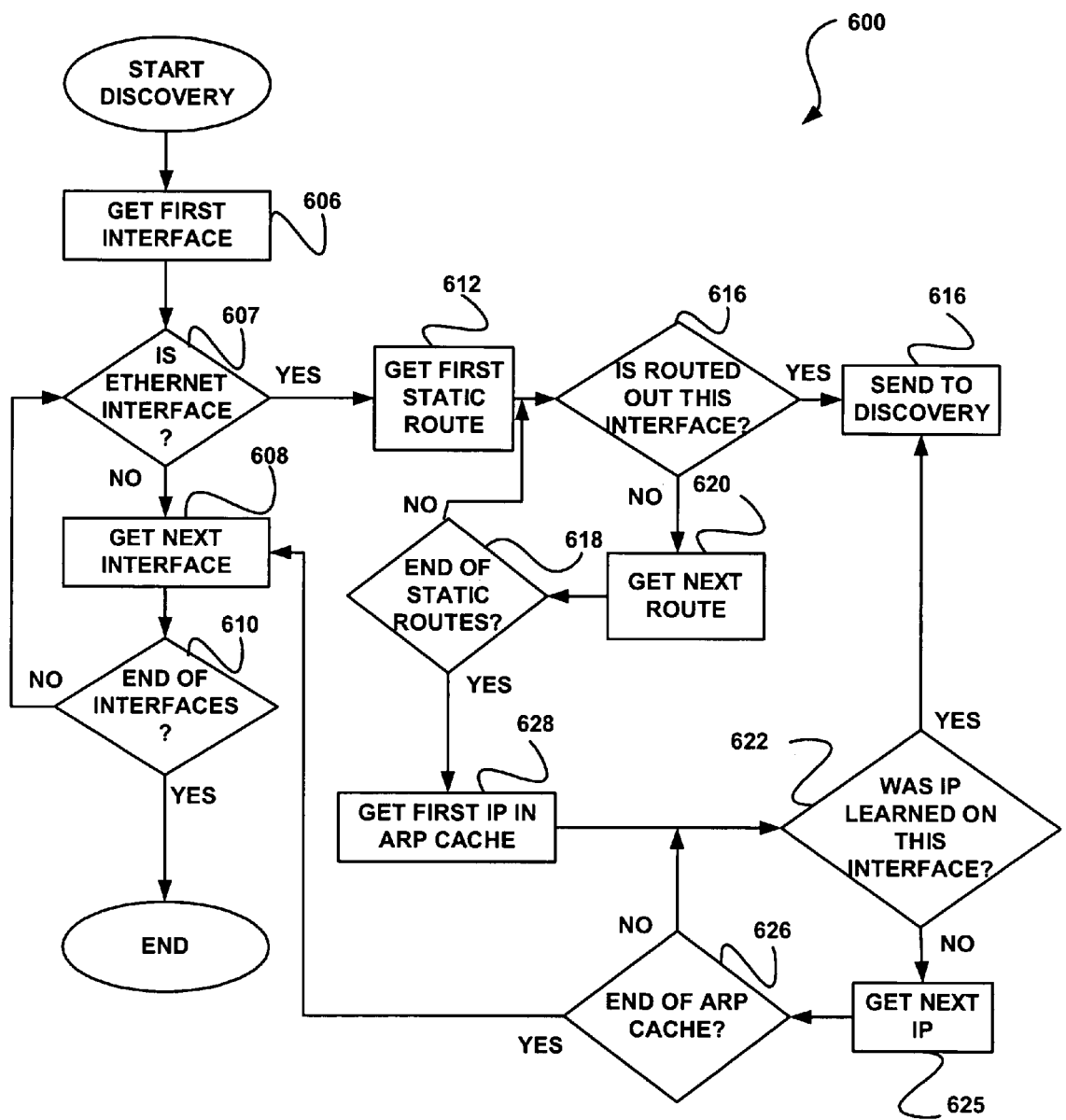
FIG. 6 shows a method for router discovery, in accordance with one embodiment.

FIG. 6 shows a method 600 for router discovery, in accordance with one embodiment. As an option, the present method 600 may be implemented in the context of the architecture and environment of FIGS. 1-5 and, in particular, in parallel with the switch discovery of FIG. 5 et al. Of course, however, the method 600 may be carried out in any desired environment.

As shown, in operation 606, a first interface is obtained. As an option, this and various following communications may be accomplished via SNMP using a community string (e.g. a user id or password that allows access to router statistics, etc.). Further, the method 600 may begin processing with a default gateway of a device performing the router discovery. Unlike the switch discovery of previous figures, the current router discovery may differ in that routers typically have fewer interfaces (e.g. one or two, etc.).

Thereafter, it is determined in decision 607 whether the interface is an Ethernet interface, since it may not necessarily be desirable to communicate over a WAN link. If the interface is not an Ethernet interface, a next interface is obtained in operation 608. Then, if there are no more interfaces per decision 610, the method 600 terminates. However, if there are indeed more interfaces per decision 610, the method 600 continues at decision 607, as shown. Thus, all Ethernet interfaces may be enumerated.

If it is determined in decision 607 that the interface is an Ethernet interface, a first static route (i.e. a predetermined route to a network device, etc.) is obtained in operation 612. Then, in decision 616, it is determined whether it is routed out of the present interface. In other words, it is determined whether the route is utilized for network communications (since it is those that are of particular interest). If so, the discovery process is initiated in operation 616 (by starting the method 600 again).

To this end, all static routes may be enumerated. In one embodiment, this may be accomplished using a RFC1213 MIB, where the enumerated interface is used as the ipRoute-IfIndex. For each ipRouteDest returned from the enumerated routes, the discovery process may again be initiated using the ipRouteNextHop Address as the router address.

However, if in decision 616, it is determined that it is not routed out of the present interface, a next route is obtained in operation 620. Thereafter, in decision 618, it is determined whether such route is an end of the static routes. If not, the method 600 proceeds at decision 616, as shown.

On the other hand, if in decision 618, it is determined that such route is indeed an end of the static routes, a first IP address is obtained from an ARP cache. See operation 628. Again, the ARP cache includes a MAC-to-IP address mapping, similar to that used hereinabove with respect to switch discovery. It is then determined whether such IP address was learned on the present interface in decision 622. This may be accomplished using the IP address and even the subnet mask of the present enumerated network device to search for any other network devices in the ARP cache of the router using the bridge MIB. If this is the case, the discovery process is initiated in operation 616 (by starting the method 600 again using the IP address for the router address), so that additional network devices may be found, etc.

However, if it is determined that the IP address was not learned on the present interface in decision 622, a next IP address is obtained in operation 625 after which it is determined whether an end of the ARP cache has been reached. If not, the method 600 continues at decision 622. If so, however, the method 600 continues by obtaining the next interface in operation 608, as shown.

By correlating information (e.g. IP addresses and the instant interface, etc.) in this manner, the present method 600 is capable of more efficiently discovering routers. For example, a detailed analysis of at least a portion of the IP addresses in the ARP cache may optionally be avoided.

Figure 7:
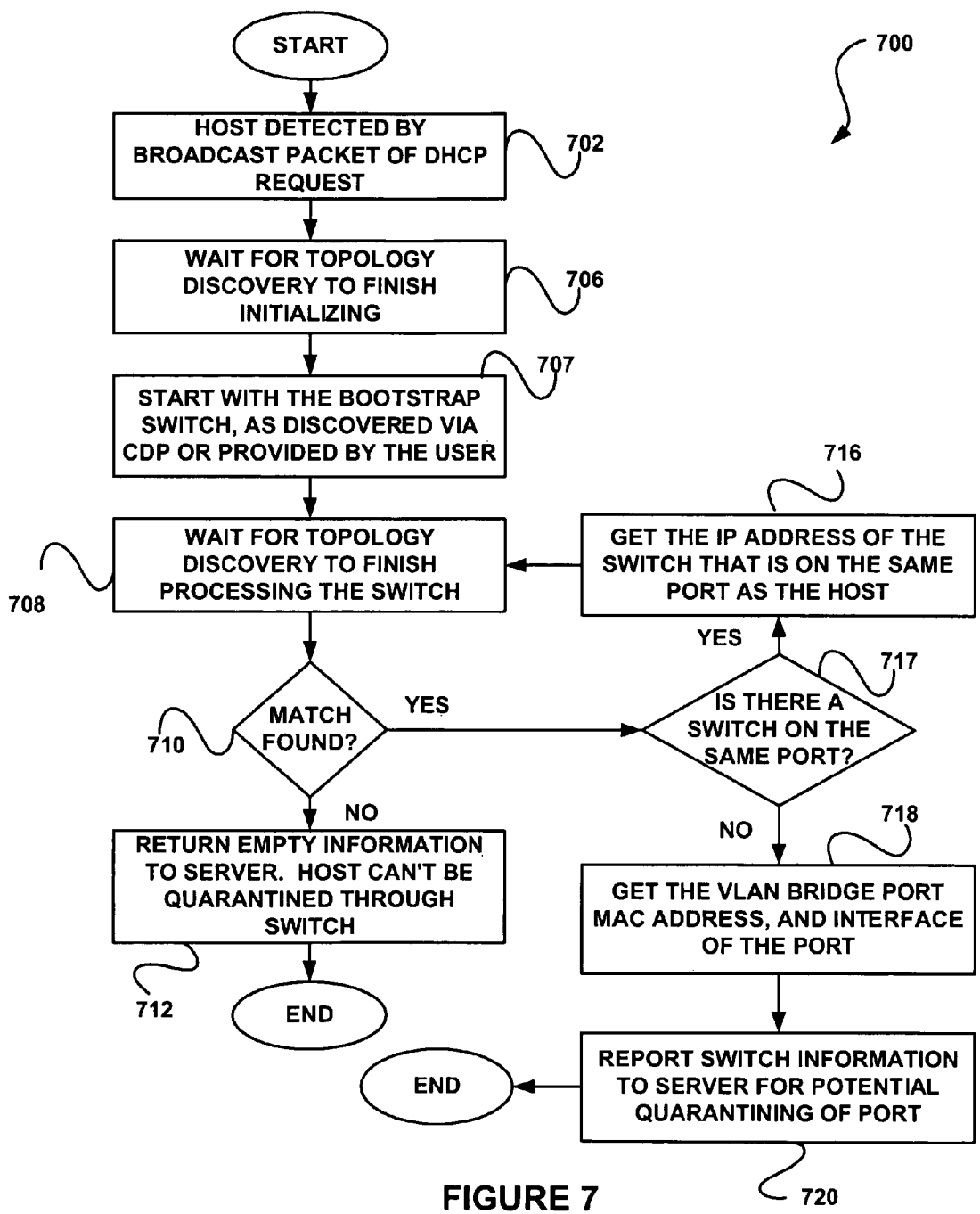
FIG. 7 shows a method for generating a topology map, in accordance with one embodiment.

FIG. 7 shows a method 700 for generating a topology map, in accordance with one embodiment. As an option, the present method 700 may be implemented in the context of the architecture and environment of FIGS. 1-6 and, in particular, after the various procedures of FIGS. 1-6. Of course, however, the method 700 may be carried out in any desired environment.

In operation 702, a host is initially detected by identifying a broadcast packet or a dynamic host configuration protocol (DHCP) request. Thereafter, the method 700 waits for topology discovery to finish initializing, as set forth in operation 706 (e.g. see, for example, the discovery operations in previous FIG. 5 et al.). The method 700 then starts with the bootstrap switch (e.g. see, for example, method 200 of FIG. 2), as discovered via CDP, or provided by a user, as indicated in operation 707. The method 700 then waits for topology discovery to finish processing the initial switch (e.g. see, for example, the discovery operations in previous FIG. 5 et al.). See operation 708.

It is then determined whether a match has been found in decision 710. Specifically, it is determined whether a MAC address associated with the host detected in operation 702 matches a MAC address in a bridge MIB forwarding database table associated with the network device. If not, empty information is returned to the server, since the host may not be quarantined through the switch. Note operation 712.

If, however, it is determined that a match has been found in decision 710, it is then determined whether there is a switch on the same port (i.e. they are directly connected, etc.). See decision 717. If so, the next IP address of the switch that is on the same port (as the host) is obtained in operation 716, and the method 700 proceeds with operation 708, etc.

Referring back to decision 717, if it is determined that there is not a switch on the same port, the VLAN information and bridge port MAC address are obtained along with the interface of the port. Note operation 718. Next, the switch information is reported to a server for potential quarantining of the port so that any desired switch management (e.g. configuration, updating, etc.) may be carried out. Note operation 720. Of course, as mentioned previously, the present network device discovery technique may be carried out for absolutely any desired purpose.

To this end, platform-independent information relating to a network device may be collected. Thereafter, a port on which the network device resides may be determined based on the platform-independent information.

Thus, the present technique may be used to periodically detect and find every switch on a target network. The detection of switches may be accomplished by accessing each switch via SNMP and storing within a database the MAC address learned on each port, as well as possibly the port type (e.g. uplink or not, etc.). In any exemplary embodiment where the switch type is an uplink port, it may further be determined to which switch the port connects. Once this information is collected, intelligent assumptions can be made about the location of the MAC address sought.

This may, in one embodiment, be accomplished via a database search for the switch that last contained the MAC address of interest. An agent (e.g. sensor, etc.) that detected the switch may then be contacted to inform it of the host MAC address to search for, along with a list of possible switches to which the host may be connected. This list may be known as "mapping hints." The list of possible switches may include the switch on which the host was last seen, as well as a list of STP roots through which the host may now be connected.

Next, the process may iterate through the list of mapping hint switches, and establish a connection to determine if the MAC is found on the port stored within an associated database. For each uplink port on the switch, a connection may be made to the network device so that a search may be performed for the MAC address. This essentially creates a search across the "level" that the previous switch is located, and below.

Once the target MAC address is found connected to a network device on the network, the algorithm may continue to step through the network map until the target MAC is found in a leaf node configuration. A leaf node configuration may be defined as a configuration where either the target MAC address is the only MAC address listed for a given port on a network device, or that the next L2 network device does not respond to SNMP queries, and represents an end to the segmented network. After discovery, the devices may be quarantined until they can be reviewed, etc. for policy management.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    collecting platform-independent information relating to a network device;
    determining a port on which the network device resides based on the platform-independent information; and
    reporting data relating to the network device, the data including port information associated with the port;
    wherein the data includes an interface of the port, and is used to manage a policy associated with the network device and to quarantine the port;
    wherein the port is determined by matching a media access control (MAC) address with a MAC address in a forwarding database.

2. The method of claim 1, wherein the network device is a simple network management protocol (SNMP)-enabled network device.

3. The method of claim 1, wherein the network device includes a switch.

4. The method of claim 1, and further comprising identifying the network device.

5. The method of claim 4, wherein the network device is identified utilizing a broadcast packet.

6. The method of claim 4, wherein the network device is identified utilizing a dynamic host configuration protocol (DHCP) packet.

7. The method of claim 1, wherein the platform-independent information is collected utilizing a simple network management protocol (SNMP).

8. The method of claim 1, wherein the port is further determined by identifying whether there is a network device on the port, if a match is found.

9. The method of claim 8, wherein the port is further determined by obtaining an IP address of the network device that is on the port.

10. The method of claim 1, wherein the port information includes a type of the port.

11. The method of claim 1, wherein the port information indicates whether the port is an uplink port.

12. The method of claim 1, wherein empty information is returned if a match of the MAC address is not found in the forwarding database.

13. The method of claim 1, wherein the forwarding database includes a plurality of entries, where each entry of the plurality of entries is associated with a network device and includes a MAC address, a port, a port type and a switch associated with the MAC address.

14. A computer program product embodied on a non-transitory computer readable medium, comprising:

computer code for collecting platform-independent information relating to a network device;

computer code for determining a port on which the network device resides based on the platform-independent information; and computer code for reporting data relating to the network device, the data including port information associated with the port;

wherein the data includes an interface of the port, and is used by the computer program product to manage a policy associated with the network device and to quarantine the port;

wherein the computer program product is operable such that the port is determined by matching a media access control (MAC) address with a MAC address in a forwarding database.

15. A system, comprising:

agents for collecting platform-independent information relating to a network device;

wherein a port on which the network device resides is determined based on the platform-independent information;

wherein data relating to the network device is reported, the data including port information associated with the port;

wherein the data includes an interface of the port, and is used by the system to manage a policy associated with the network device and to quarantine the port;

wherein the system is operable such that the port is determined by matching a media access control (MAC) address with a MAC address in a forwarding database.

* * * * *